No. 767,954. PATENTED AUG. 16, 1904.
E. W. POTTS.
TROLLEY WHEEL.
APPLICATION FILED JAN. 12, 1903.
NO MODEL.
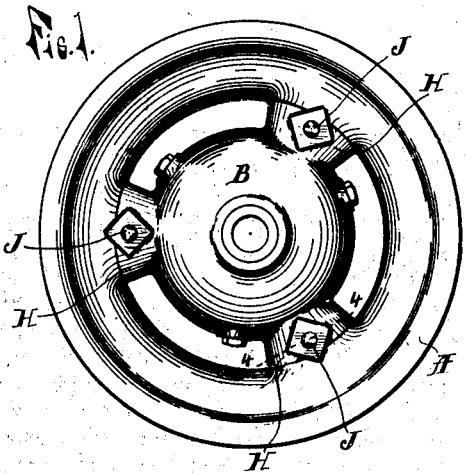
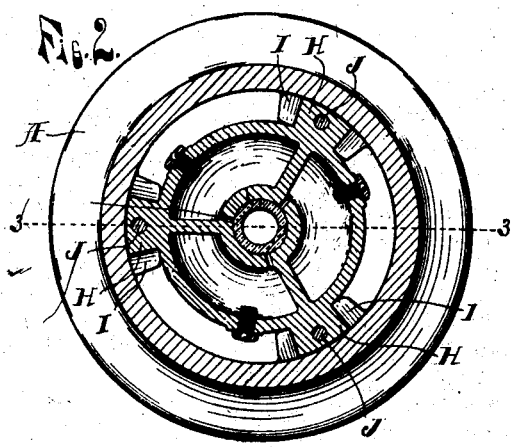
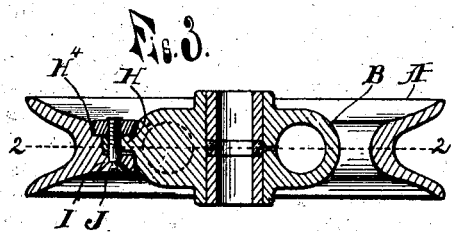
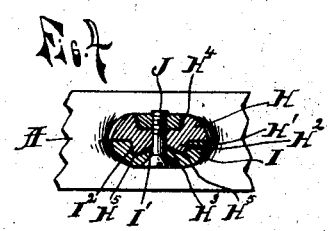
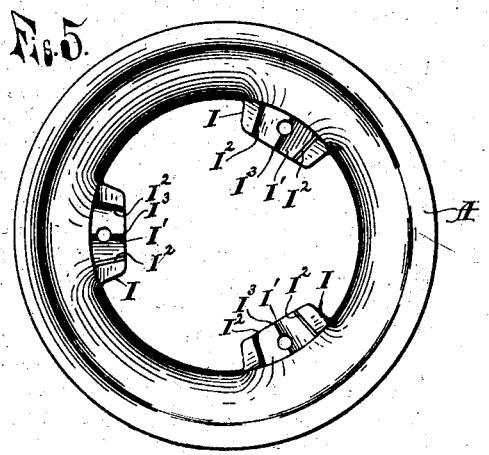
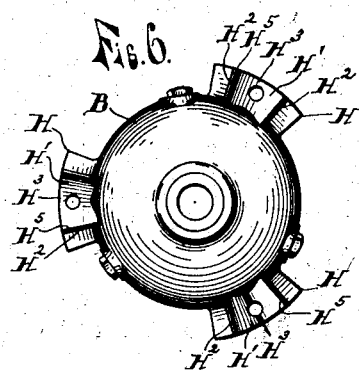
WITNESSES.
Lewis E. Flanders
Thomas G. Longstaff
INVENTOR.
Elijah W. Potts
By Barthel Wedhef
Attorneys.

No. 767,954.

Patented August 16, 1904.

UNITED STATES PATENT OFFICE.

ELIJAH W. POTTS, OF DETROIT, MICHIGAN, ASSIGNOR TO DETROIT TROLLEY WHEEL AND ELECTRICAL EQUIPMENT COMPANY, OF DETROIT, MICHIGAN, A CORPORATION.

TROLLEY-WHEEL.

SPECIFICATION forming part of Letters Patent No. 767,954, dated August 16, 1904.

Application filed January 12, 1903. Serial No. 138,594. (No model.)

*To all whom it may concern:*

Be it known that I, ELIJAH W. POTTS, a citizen of the United States of America, residing at Detroit, in the county of Wayne and State of Michigan, have invented certain new and useful Improvements in Trolley-Wheels, of which the following is a specification, reference being had therein to the accompanying drawings.

My invention relates to improvements in trolley-wheels; and its object is to provide a wheel having a detachable rim, which rim may be easily and quickly removed when worn out and a new one put in its place, and to provide such means for securing the rim in place that it is made as rigid as a solid wheel and has no protruding parts.

To this end my invention comprises a separable rim member and a separable hub member each having short projecting lugs by which they may be attached; and it especially consists in the new and useful features hereinafter more fully described, and pointed out in the claims, reference being had to the accompanying drawings, in which—

Figure 1 is a side elevation of a device embodying my invention; Fig. 2, a section of the same on the line 2 2 of Fig. 3; Fig. 3, a section on the line 3 3 of Fig. 2; Fig. 4, a sectional detail on the line 4 4 of Fig. 1; and Figs. 5 and 6 are side elevations of the rim and hub members, respectively, showing each detached.

As shown in the drawings, A is the rim, and B the hub member, of the wheel. The rim is of the ordinary form, being provided with outwardly-projecting flanges which form the peripheral groove to engage the trolley-wire.

To connect the rim to the hub member, each is provided with projecting lugs, the lugs H on the hub member projecting outward and engaging the inner edges of the rim and the lugs I on the rim projecting inward and engaging the outer wall of the hub member, said lugs overlapping each other when the rim is secured in place to form connecting members or arms. To prevent the rim from turning upon the hub portion, the lugs I are each provided with a channel I' in its face, the sides I² of which channel extend radially toward the axis of the rim and are inclined downward toward each other, the wall of the channel being raised at the center slightly to form the central ridge I³ thereon, and on the face of each lug H is a rib H', formed with sides H², extending radially toward the axis of the hub and formed with a slant to fit within the channel I', the outer portion of the rib H' being cut away to form the V-groove H³ to receive the ridge I³. The lugs are also provided with coincident openings to receive the stove-bolts J, the screw-heads of which bolts engage countersinks in the lugs I, and the nuts lie within the recesses H⁴ in the lugs H. The nuts are square and have tapering sides, and the recesses H⁴ are formed to fit the nuts, so that when the bolts are turned in to secure the parts together the nuts will be drawn into the recesses and prevented from turning. When the lugs H and I are drawn together by the bolts J, only the angles or projections H⁵, formed by the meeting of the sides H² and the V-grooves H³, will contact the bottom of the channels I', and the sides H² being tapered the lugs H will seat firmly without the necessity of machining the castings, and the members will be held in such contact as to make a good conductor for the electrical current. The lugs H by contacting the rim at their outer ends center the rim on the hub, and the bolts are prevented from working loose by riveting the ends of each bolt down against the nut.

By this construction I secure a very cheap and durable wheel, as the rim when worn may be replaced by a new one, thus obviating the necessity of providing an entirely new wheel, and a very rigid device is secured which presents a neat appearance, there being no projecting bolts, heads, or nuts.

Having thus fully described my invention, what I claim is—

1. In a wheel, the combination of a rim member and a hub member, the rim member having interior short projecting lugs, the hub member having exterior short projecting lugs, the two sets of lugs having complementary faces fitting into each other and securing bolts to form smooth outer surfaces.

2. In a wheel, the combination of a rim member and a hub member, the rim member bearing inwardly-projecting lugs having substantially V-shaped channels, the hub member having outwardly-projecting lugs with substantially V-shaped ribs, the channels and the ribs fitting together, the ribs contacting at the bottom of the channels at their edges only, and means for securing the lugs together.

3. In a wheel, the combination of a rim member and a hub member, the hub member having outwardly-projecting lugs with ribs whose sides extend radially toward the axis of the hub, the rim member having lugs provided with channels adapted to receive the ribs and having sides extending radially toward the axis of the rim, and bolts passing through the lugs to secure them together.

4. In a wheel, the combination of a hub member and a rim member, the hub member having outwardly-projecting lugs formed with openings and ribs having slanting sides and grooved outer portions, the sides and the edges of the grooves forming projecting angles, the rim member having lugs provided with openings and with channels having slanting sides to receive the ribs of the lugs on the hub member, and means for securing the lugs together.

5. In a wheel, the combination of a rim member and a hub member, the rim member being provided with inwardly-projecting lugs having openings and countersinks and formed with channels having slanting sides extending radially toward the axis of the rim and having ridges on their walls, the hub member being provided with outwardly-projecting lugs having ribs formed with slanting sides extending radially toward the axis of the hub and formed at their outer portions to engage the walls of the channels at their edges and provided with openings and squared recesses, and bolts in the openings in the lugs having their heads engaging the countersinks, and nuts lying in the recesses.

In testimony whereof I affix my signature in presence of two witnesses.

ELIJAH W. POTTS.

Witnesses:
OTTO F. BARTHEL,
THOMAS G. LONGSTAFF.